US011027680B2

(12) United States Patent
Line et al.

(10) Patent No.: US 11,027,680 B2
(45) Date of Patent: Jun. 8, 2021

(54) VEHICLE TRACKS

(71) Applicant: Ford Global Technologies, LLC, Dearborn, MI (US)

(72) Inventors: Johnathan Andrew Line, Northville, MI (US); Daniel Ferretti, Commerce Township, MI (US); Jimmy Moua, Canton, MI (US); Alan George Dry, Grosse Pointe Woods, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 40 days.

(21) Appl. No.: 16/218,662

(22) Filed: Dec. 13, 2018

(65) Prior Publication Data
US 2020/0189498 A1   Jun. 18, 2020

(51) Int. Cl.
*H02J 50/05* (2016.01)
*B60R 16/03* (2006.01)
*B60R 16/037* (2006.01)
*B60N 2/02* (2006.01)
*B60N 2/06* (2006.01)
*B60N 2/01* (2006.01)

(52) U.S. Cl.
CPC ............... *B60R 16/03* (2013.01); *B60N 2/01* (2013.01); *B60N 2/0244* (2013.01); *B60N 2/06* (2013.01); *B60R 16/037* (2013.01); *H02J 50/05* (2016.02); *B60N 2002/0264* (2013.01)

(58) Field of Classification Search
CPC ........ B60R 16/03; B60R 16/037; H02J 50/05; B60N 2/01; B60N 2/0244; B60N 2/06; B60N 2002/0264

USPC ....................................................... 307/10.1
See application file for complete search history.

(56) References Cited

U.S. PATENT DOCUMENTS

| 4,818,022 | A  | * | 4/1989  | Nishimura ............... B60N 2/06 280/804 |
| 5,890,779 | A  | * | 4/1999  | Blackburn ........... B60N 2/0224 307/10.1 |
| 8,912,687 | B2 |   | 12/2014 | Kesler et al. |
| 9,318,922 | B2 |   | 4/2016  | Hall et al. |
| 9,601,265 | B2 | * | 3/2017  | Sugino .................... H01F 38/14 |
| 2005/0150705 | A1 | * | 7/2005 | Vincent .................... B60N 2/06 180/271 |
| 2005/0247820 | A1 | * | 11/2005 | Feist ........................ B60N 2/06 244/118.6 |
| 2007/0132559 | A1 | * | 6/2007 | Schleeh ............ B60R 21/01532 340/425.5 |
| 2009/0007191 | A1 | * | 1/2009 | Furio .................. B64D 11/0624 725/75 |
| 2009/0295223 | A1 | * | 12/2009 | Bauer ..................... H02J 50/10 307/9.1 |
| 2010/0052386 | A1 | * | 3/2010 | Phinney .................... B60N 2/01 297/257 |

(Continued)

FOREIGN PATENT DOCUMENTS

EP    2793356 A1 * 10/2014 ............. B60L 5/005

*Primary Examiner* — Rexford N Barnie
*Assistant Examiner* — Brian K Baxter
(74) *Attorney, Agent, or Firm* — David Coppiellie; Price Heneveld LLP

(57) ABSTRACT

A vehicle includes a track that defines a guide channel, first and second transmitters positioned on first and second sides of the guide channel, respectively, and a bridge that extends over an upper portion of the track to cover the guide channel when the bridge is in a closed position.

20 Claims, 9 Drawing Sheets

(56) References Cited

U.S. PATENT DOCUMENTS

| | | | |
|---|---|---|---|
| 2012/0210372 A1* | 8/2012 | Kaufmann | B64C 1/20 |
| | | | 725/77 |
| 2013/0167817 A1* | 7/2013 | Bauer | H02J 5/005 |
| | | | 123/621 |
| 2014/0152088 A1* | 6/2014 | Bauer | B60R 16/03 |
| | | | 307/9.1 |
| 2014/0206302 A1* | 7/2014 | Terada | B60N 2/0715 |
| | | | 455/90.1 |
| 2014/0232185 A1 | 8/2014 | Sempel et al. | |
| 2014/0252813 A1* | 9/2014 | Lee | H02J 50/12 |
| | | | 297/180.12 |
| 2015/0061380 A1* | 3/2015 | Schomacker | B64C 1/18 |
| | | | 307/9.1 |
| 2015/0326061 A1* | 11/2015 | Davison | H02J 7/0044 |
| | | | 320/108 |
| 2017/0080826 A1* | 3/2017 | Bonk | B60N 2/06 |
| 2017/0155268 A1* | 6/2017 | Ayotte | H02J 7/025 |
| 2018/0019616 A1 | 1/2018 | Yasunori | |
| 2018/0056848 A1* | 3/2018 | Koehler | B64C 1/20 |
| 2019/0161191 A1* | 5/2019 | Kohler | B64C 1/20 |

\* cited by examiner

VEHICLE TRACKS

FIELD OF THE DISCLOSURE

The present disclosure generally relates to vehicles. More specifically, the present disclosure relates to vehicle tracks.

BACKGROUND OF THE INVENTION

Vehicles are typically provided with one or more seating assemblies. Consumers often desire a variety of comfort options and adjustments, however, with increasing comfort options and adjustability comes increasing complexity of execution. Accordingly, additional seating assemblies and/or executions are needed in an effort to meet consumer demands.

SUMMARY OF THE INVENTION

According to a first aspect of the present disclosure, a vehicle includes a track that defines a guide channel, first and second transmitters positioned on first and second sides of the guide channel, respectively, and a bridge that extends over an upper portion of the track to cover the guide channel when the bridge is in a closed position.

Embodiments of the first aspect of the present disclosure can include any one or a combination of the following features:
  the vehicle further includes an anchor that engages with the guide channel and actuates the bridge to an open position;
  the anchor further includes first and second receivers positioned on first and second sides of the anchor, respectively;
  the first and second receivers on the anchor receive a signal from at least one of the first and second transmitters on the guide channel;
  the signal received by the first and second receivers from the first and second transmitters is a power transfer signal;
  the power transfer signal is transmitted from the first and second transmitter to the first and second receivers by capacitive power transfer;
  the track further includes a first transceiver and the anchor further includes a second transceiver; and
  the first and second transceivers communicate data to and from the anchor.

According to a second aspect of the present disclosure, a vehicle includes a track that defines a guide channel. First and second electrical transmitters are positioned on first and second sides of the guide channel, respectively. First and second electrical receivers are positioned on first and second sides of an anchor, respectively. The anchor is received within the guide channel and is configured to communicate with the first and second electrical transmitters.

Embodiments of the second aspect of the present disclosure can include any one or a combination of the following features:
  the vehicle further includes a bridge that extends over an upper portion of the track to cover the guide channel when in a closed position;
  the anchor actuates the bridge to an open position at locations along the track where the anchor is located;
  the first and second electrical receivers on the anchor receive a signal from at least one of the first and second electrical transmitters on the guide channel;
  the signal received by the first and second electrical receivers from the first and second electrical transmitters is a power transfer signal;
  the power transfer signal is transmitted from the first and second electrical transmitter to the first and second electrical receivers by capacitive power transfer; and
  the track further includes a first transceiver and the anchor further includes a second transceiver, wherein the first and second transceivers communicate data to and from the anchor.

According to a third aspect of the present disclosure, a vehicle includes a track that defines a guide channel. First and second transmitters are positioned on first and second sides of the guide channel, respectively. A bridge extends over an upper portion of the track when in a closed position. An anchor engages with the guide channel and actuates the bridge to an open position. First and second receivers are positioned on first and second sides of the anchor, respectively.

Embodiments of the third aspect of the present disclosure can include any one or a combination of the following features:
  the first and second receivers on the anchor receive a signal from at least one of the first and second transmitters on the guide channel;
  the signal received by the first and second receivers from the first and second transmitters is a power transfer signal;
  the power transfer signal is transmitted from the first and second transmitter to the first and second receivers by capacitive power transfer; and
  the track further includes a first transceiver and the anchor further includes a second transceiver, wherein the first and second transceivers communicate data to and from the anchor.

These and other aspects, objects, and features of the present disclosure will be understood and appreciated by those skilled in the art upon studying the following specification, claims, and appended drawings.

BRIEF DESCRIPTION DRAWINGS

DETAILED DESCRIPTION OF THE PREFERRED EMBODIMENTS

Figure 1:
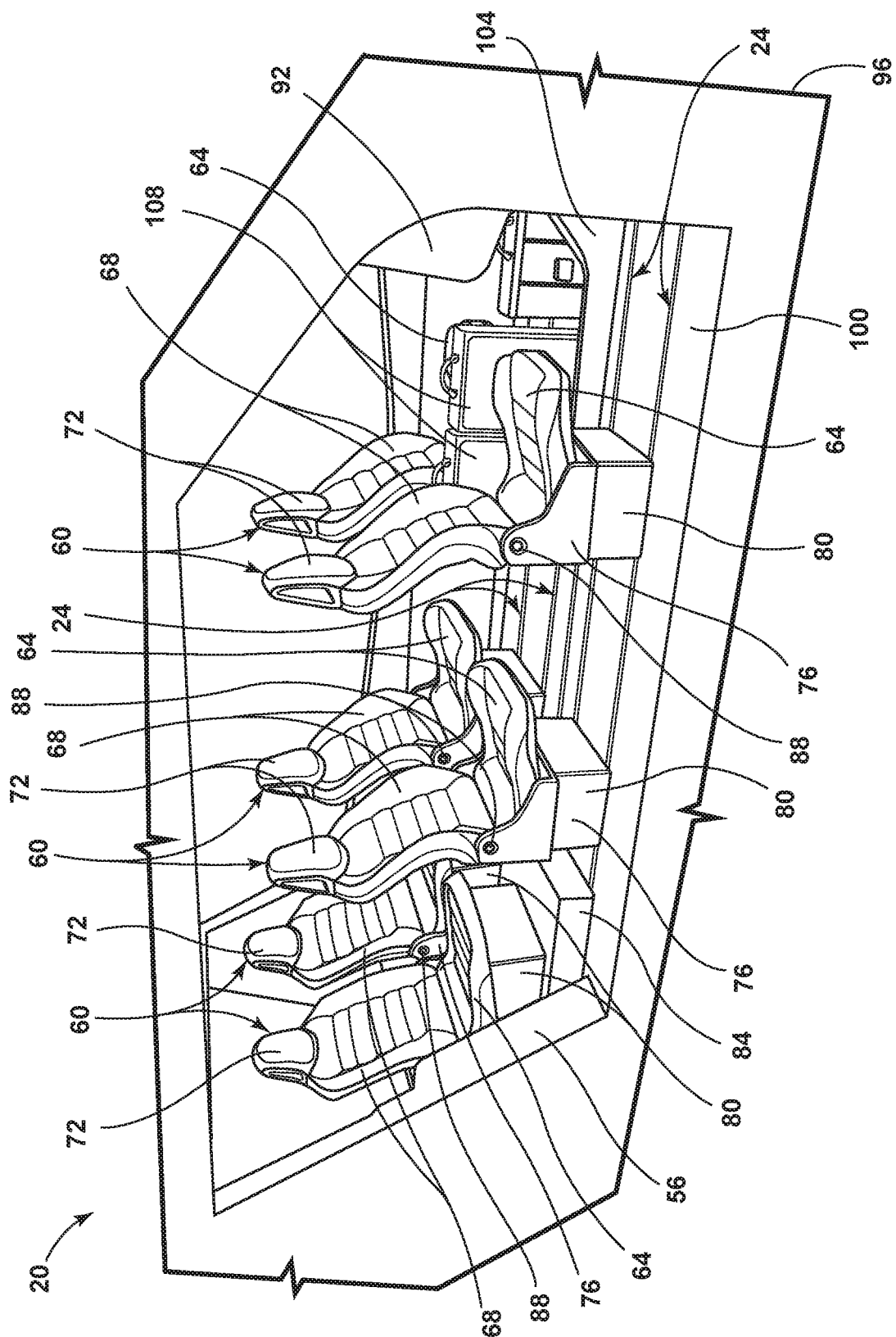
FIG. 1 is a side perspective view of a cabin of a vehicle, illustrating a configuration of seating assemblies, according to one example.

For purposes of description herein, the terms "upper," "lower," "right," "left," "rear," "front," "vertical," "horizontal," and derivatives thereof shall relate to the concepts as oriented in FIG. 1. However, it is to he understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a vehicle. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring to FIGS. 1-10, reference numeral 20 generally designates a vehicle. The vehicle 20 may be a motor vehicle, a land vehicle, an air vehicle, and/or a water vehicle. The vehicle 20 can include a track 24 that defines a guide channel 28. A bridge 32 can be provided that extends over an upper portion 36 of the track 24 to cover the guide channel 28 when the bridge 32 is in a closed position. A first transmitter 40 may be positioned on a first side 44 of the guide channel 28 and a second transmitter 48 may be positioned on a second side 52 of the guide channel 28. In various examples, the first and second transmitters 40, 48 may be electrical transmitters.

Figure 2:
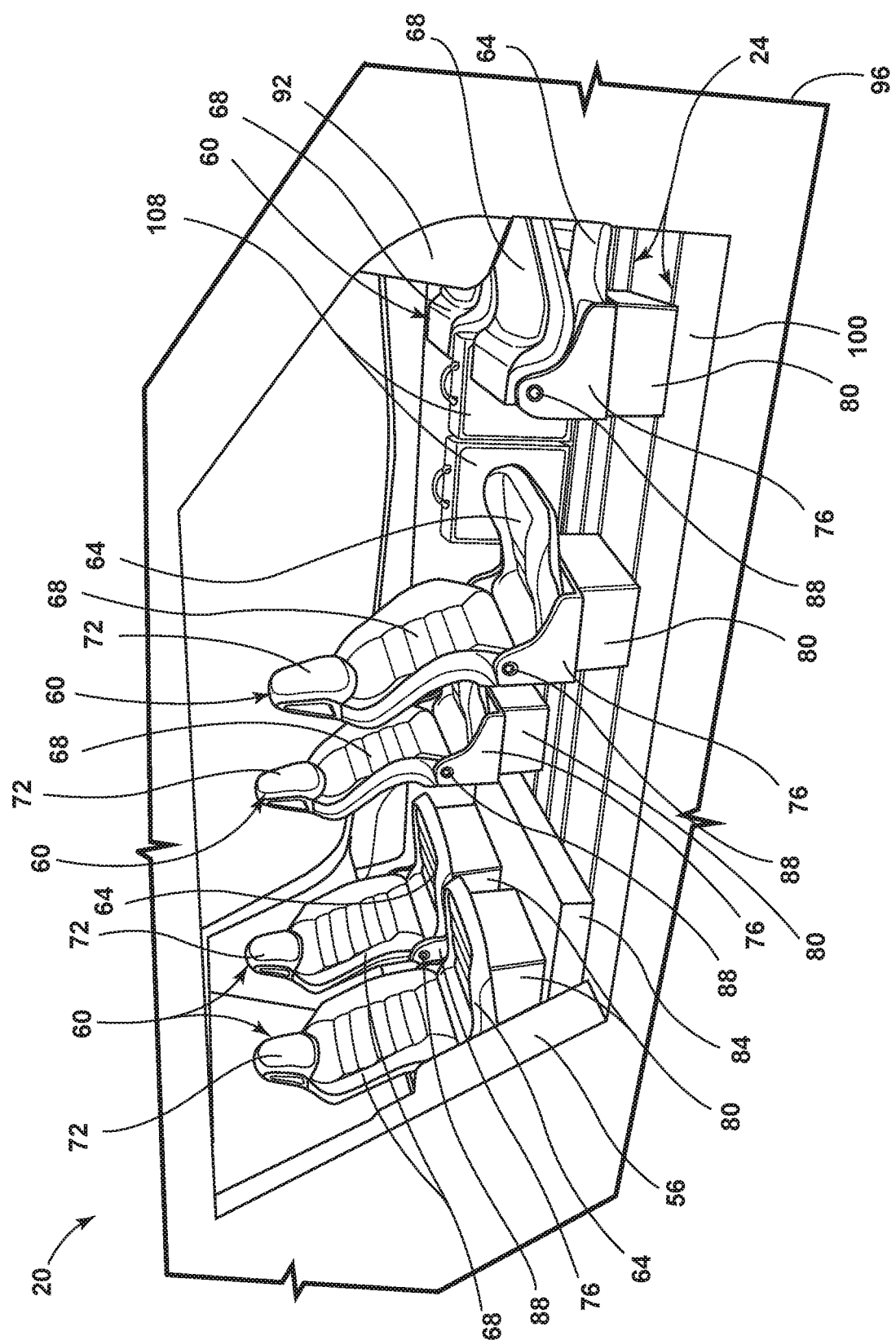
FIG. 2 is a side perspective view of the cabin of the vehicle, illustrating a configuration of the seating assemblies, according to another example.
Figure 3:
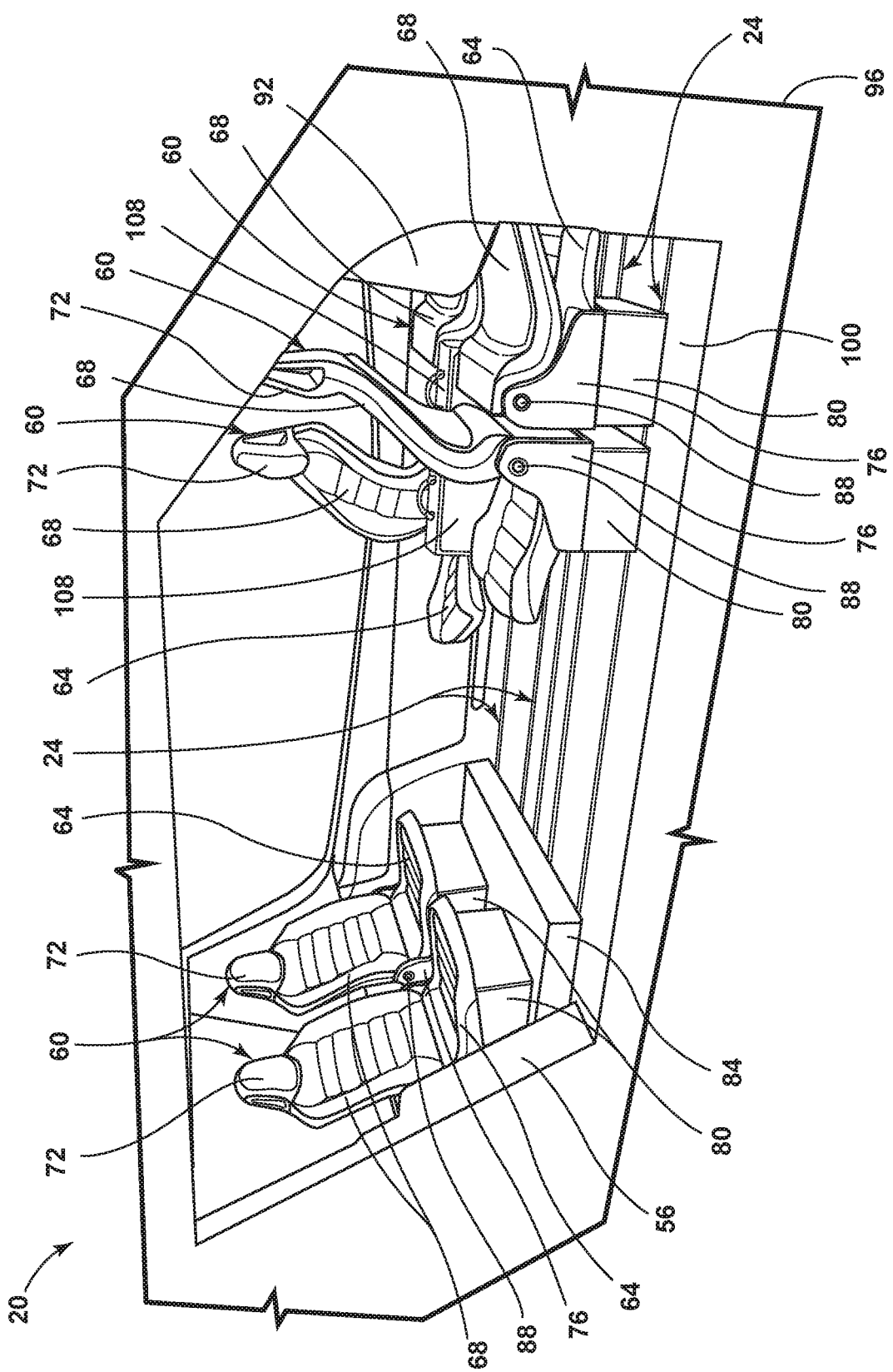
FIG. 3 is a side perspective view of the cabin of the vehicle, illustrating a configuration of the seating assemblies, according to one example.

Referring again to FIGS. 1-3, a cabin 56 of the vehicle 20 can be provided with one or more seating assemblies 60. The seating assemblies 60 can be positioned at various locations along the tracks 24 within the cabin 56. The seating assemblies 60 are provided with a seat 64, a seatback 68, and/or a headrest 72. The seat 64 and the seatback 68 are pivotably coupled to one another by way of a carrier 76. In some examples, the carrier 76 may be directly coupled to the tracks 24 (e.g., by anchors). Alternatively, in various examples, the carrier 76 may be coupled to the tracks 24 indirectly (e.g., by a carriage 80). In some examples, the seating assemblies 60 that are positioned at a rearward most location within the cabin 56 may be provided with an additional platform 84 that is directly coupled to either the carrier 76 or the carriage 80. The platform 84 can provide the rearward most seating assemblies 60 with additional vertical height relative to the remaining seating assemblies 60 to allow occupants of the rearward most seating assemblies 60 a better vantage point and more interesting view than if the seating assemblies 60 were all at about the same height. The platform 84, in some examples, may couple a plurality of the seating assemblies 60 together. For example, the platform 84 may provide a common riser or dais between two adjacent seating assemblies 60. The seating assemblies 60 can he positioned in a conventional first row, second row, and/or third row configuration as shown in FIG. 1. Alternatively, the seating assemblies 60 can be positioned in an unconventional manner, such as the configurations shown in FIGS. 2 and 3. For example, one or more of the seating assemblies 60 may be placed in a stored position, such as those pictured in a forward most row in FIGS. 2 and 3. When in the stored position, the seating assemblies 60 may be stored in a number of positions and/or locations. For example, the seating assemblies 60 may be forward-dumped such that the seatback 68 is generally horizontal and generally parallel with the seat 64 by pivoting the seatback 68 forward about a pivot point 88 of the carrier 76. When in the stored position, the seating assemblies 60 may be stored beneath a forward console 92 that is positioned proximate a front 96 of the vehicle 20. The seating assemblies 60 may be provided with a swivel functionality that allows the seating assemblies 60 to pivot about a vertical axis relative to a floor 100 of the vehicle 20. For example, the carrier 76 may be coupled to the floor 100 by a swivel assembly that permits pivotable motion of the seating assembly 60 about a vertical axis while maintaining engagement of the seating assembly 60 with the tracks 24. In some examples, where the carriage 80 is employed, the carrier 76 and the carriage 80 may be coupled to one another in a manner that permits the pivotable motion of the seating assembly 60 about the vertical axis while maintaining the engagement of the seating assembly 60 with the tracks 24. For example, the carriage 80 may remain coupled to the track(s) 24 and rotationally stationary relative to the track(s) 24 while the carrier 76 and the seating assembly 60 pivot or rotate about the vertical axis relative to the track(s) 24. In examples where the platform 84 is employed, the platform 84 may remain coupled to the track(s) 24 and rotationally stationary relative to the track(s) 24 while the seating assembly 60, the carrier 76, and/or the carriage 80 are capable of pivoting or rotating about the vertical axis relative to the track(s) 24. In various examples, a central console 104 may be provided in a location between at least some of the seating assemblies 60 that are laterally adjacent to one another. The central console 104 may generally extend along a longitudinal axis, or travel axis, of the vehicle 20. The central console 104 can be provided with a number of functionalities, such as storing of luggage 108, providing electrical connections for electrical devices, providing data connections for interaction with the vehicle 20, and/or other convenience and comfort functionalities. The configurations illustrated in FIGS. 1-3 may be referred to as passenger arrangements where the vehicle is primarily being used to transport passengers and their accompanying cargo items. The configurations illustrated in FIGS. 1-3 are exemplary in nature and are not intended to limit the scope of the present disclosure.

Figure 4:
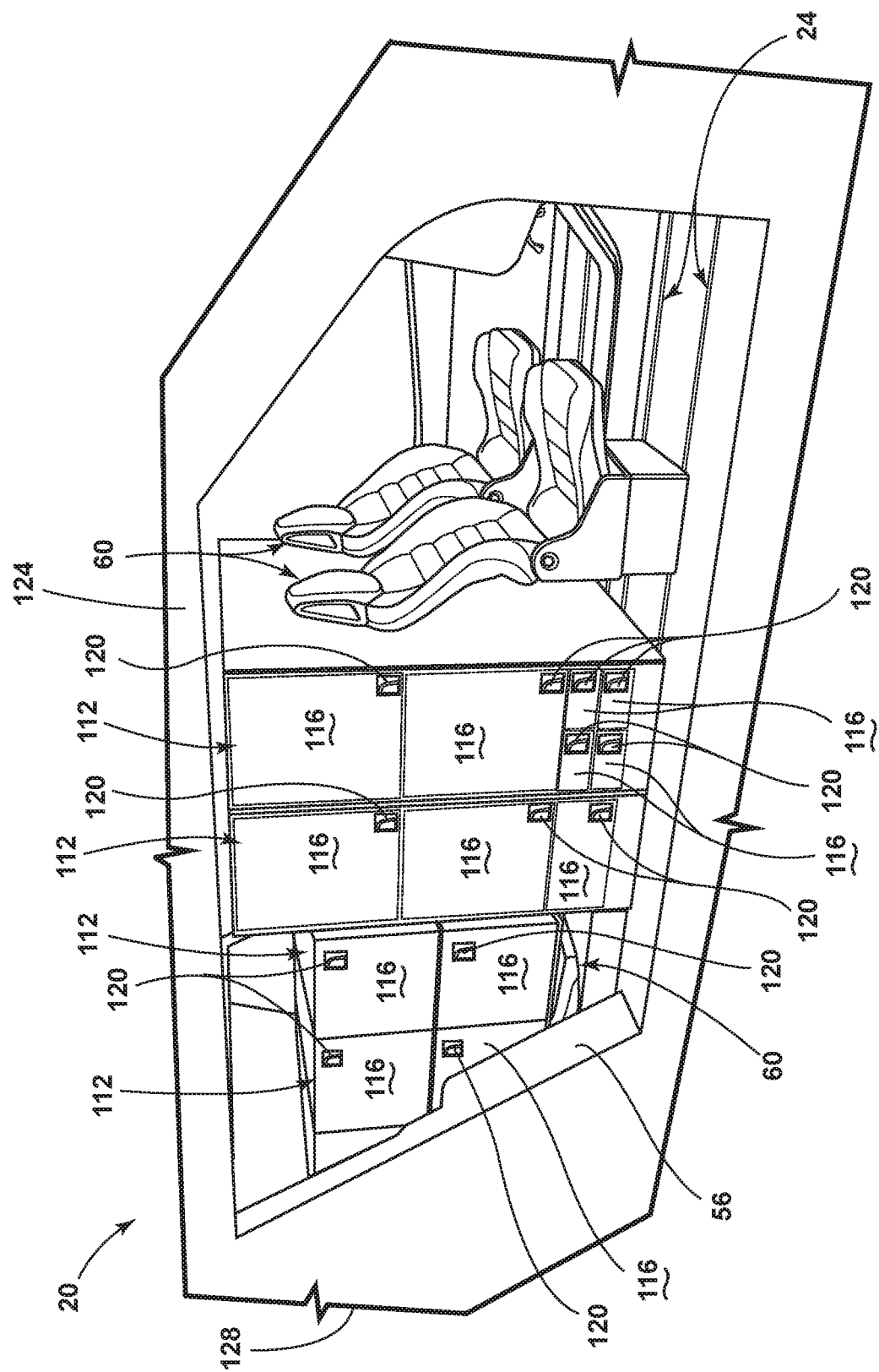
FIG. 4 is a side perspective view of the cabin of the vehicle, illustrating a configuration of the seating assemblies and storage units, according to one example.
Figure 5:
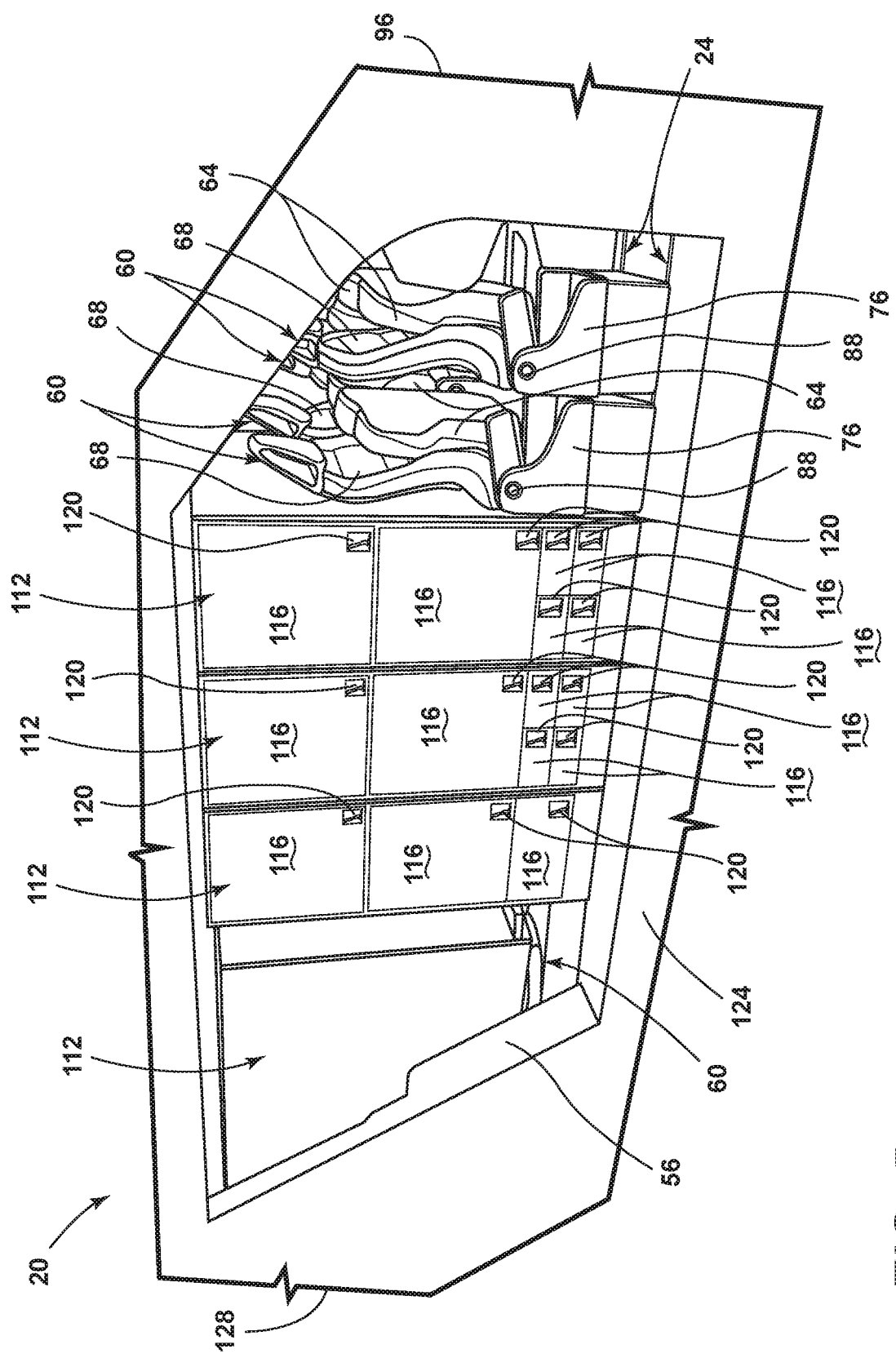
FIG. 5 is a side perspective view of the cabin of the vehicle, illustrating a configuration of the seating assemblies and the storage units, according to another example.
Figure 6:
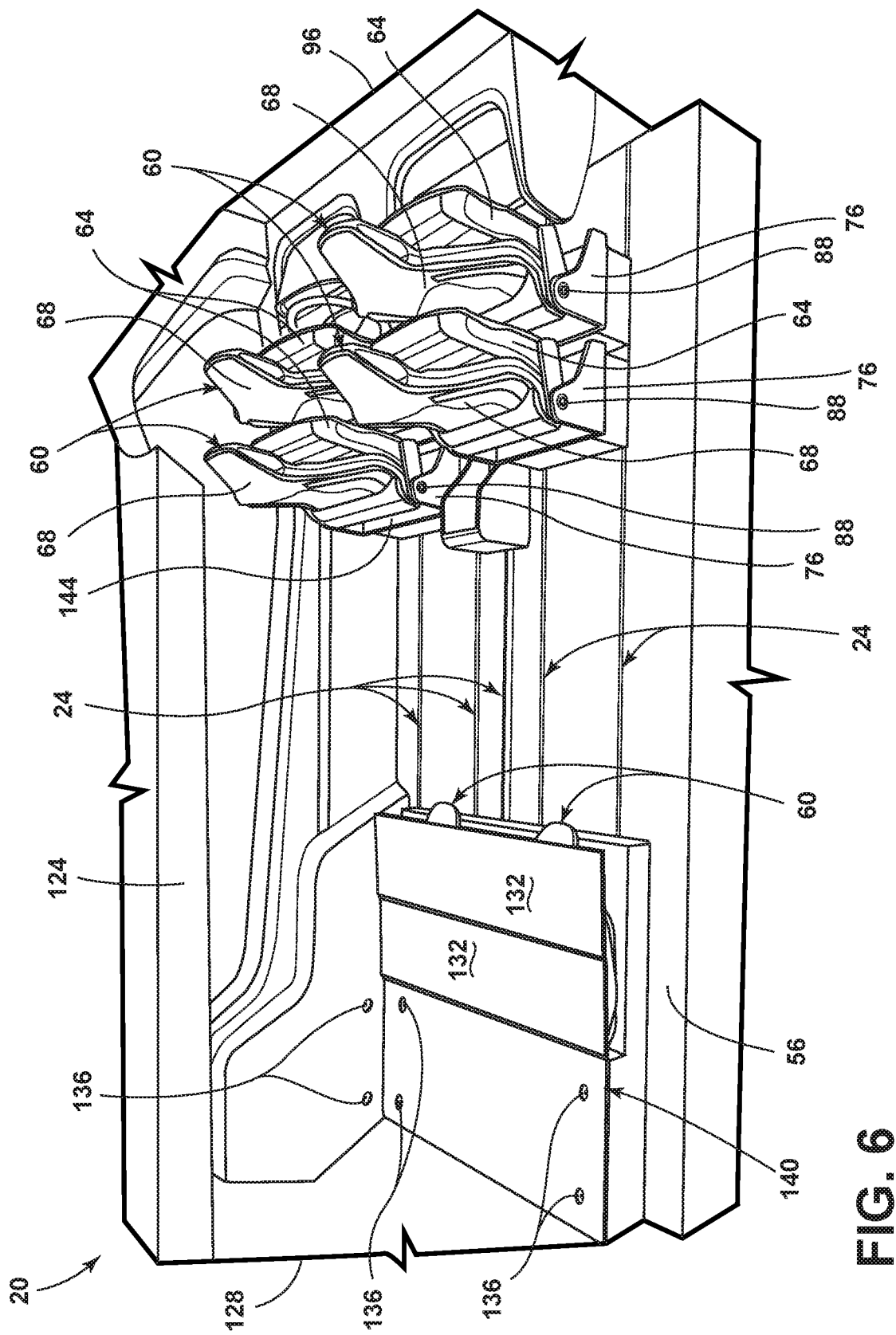
FIG. 6 is a side perspective view of the cabin of the vehicle, illustrating a configuration of the seating assemblies, according to one example.

Referring to FIGS. 4-6, a number of exemplary configurations are illustrated where the vehicle 20 is primarily utilized for cargo transport. In some cargo transport examples, such as that shown in FIG. 4, one or more of the seating assemblies 60 may remain available for occupants that are traveling with the cargo items (e.g., vehicle operators, vehicle monitors, security personnel, etc.). The features and functionalities described above for the cabin 56 of the vehicle 20, the seating assemblies 60, the carriers 76, the carriages 80, and the platform 84 can be provided in whole or in part with the examples depicted in FIGS. 4-6 without departing from the concepts disclosed herein, however, for the sake of brevity the features and functionalities will not be repeated. In some cargo transport configurations, such as that depicted in FIG. 4, unused seating assemblies 60 may be removed from the cabin 56 of the vehicle 20 to make room for cargo items to be stored within the cabin 56 while maintaining one or more of the seating assemblies 60 as available for occupants. The cargo items may be stored in storage units 112 that are placed within the cabin 56. The storage units 112 may engage with the tracks 24 such that the storage units 112 are prevented from unintentional motion during maneuvering of the vehicle 20. The storage units 112 may also receive power from the tracks 24 and/or communicate data between the storage units 112 and the vehicle 20 by way of one or more transceivers. The power and/or data communication provided to the storage units 112 may be used for temperature control of one or more storage compartments 116 within the storage units 112, for lighting the storage compartments 116, for locking/unlocking the storage compartments 116, for actuating a door of the storage compartments 116, for actuating the storage units 112 along the tracks 24, and/or for monitoring contents of the storage compartments 116 (e.g., sensors, imagers, etc.). The storage compartments 116 may be provided with latch assemblies 120 that can be actuated manually or automatically to provide access to an interior of the storage compartments 116. The storage compartments 116 can be accessed from a side 124 or a rear 128 of the vehicle 20. Storage units 112 that are accessible from the rear 128 of the vehicle 20 may be positioned on a rear surface 132 of rearward most seating assemblies 60 when the rearward most seating assemblies 60 are placed in a stowed or fold-flat position (see FIG. 6). When storage units 112 are placed on the rear surfaces 132 of the rearward most seating assemblies 60, these storage units 112 may not be secured to the vehicle 20 by way of the tracks 24. Alternatively, the storage units 112 that are placed on the rear surfaces 132 of the rearward most seating assemblies 60 may be secured to the vehicle 20 by interaction with various components of the cabin 56 of the vehicle 20. For example, the storage units 112 that are placed on the rear surfaces 132 of the rearward most seating assemblies 60 may be secured to the vehicle 20 by interacting with the storage units 112 that are secured to the tracks 24, by tethering or anchoring to tie downs 136 within a cargo area 140 of the cabin 56, and/or by other suitable approaches.

With specific reference to FIGS. 5 and 6, the seating assemblies 60 may additionally or alternatively be capable of being stored in stacked fashion. The seating assemblies 60 may be pivotably coupled to the carriers 76 in a manner that allows the seatback 68 to be placed in a forward-dumped position over the seat 64 (see FIGS. 2 and 3) and/or the seat 64 may be pivoted upward toward the seatback 68 in a stadium-seating manner such that the seat 64 is generally vertical and generally parallel to the seatback 68. Once in a stowed-and-stacked position depicted in FIGS. 5 and 6, a cargo area of the cabin 56 of the vehicle can be increased while maintaining the ability to quickly transition the vehicle 20 back to a primary passenger transport configuration once cargo items have been delivered or removed. To assume the stowed-and-stacked position the seat 64 of the seating assembly 60 is pivoted upward toward the seatback 68 about the pivot point 88 of the carrier 76. Then, the seating assembly 60 can be actuated to an end (e.g., the front 96 or the rear 128) of the vehicle 20 along the tracks 24 such that the seating assemblies 60 may occupy a substantially smaller footprint or surface area than if the seating assemblies 60 were stored in an alternative manner. In some examples, the seating assemblies 60 may be provided with a storage area 144 between an underside of the seat 64 and the carrier 76. The storage area 144 may be provided as a pass-through or open storage area. The storage area 144 may be utilized by occupants of the seating assemblies 60 to store cargo items. In various examples, including those where the seating assemblies are placed in the stowed-and-stacked position, the storage areas 144 may be aligned in tandem or in-line seating assemblies 60 such that long cargo items (e.g., wood beams) may be stored and supported along their length in a manner that also retains the long cargo items within a limited lateral region and prevent the long cargo items from affecting passengers or other cargo items during maneuvers of the vehicle 20.

Figure 8:
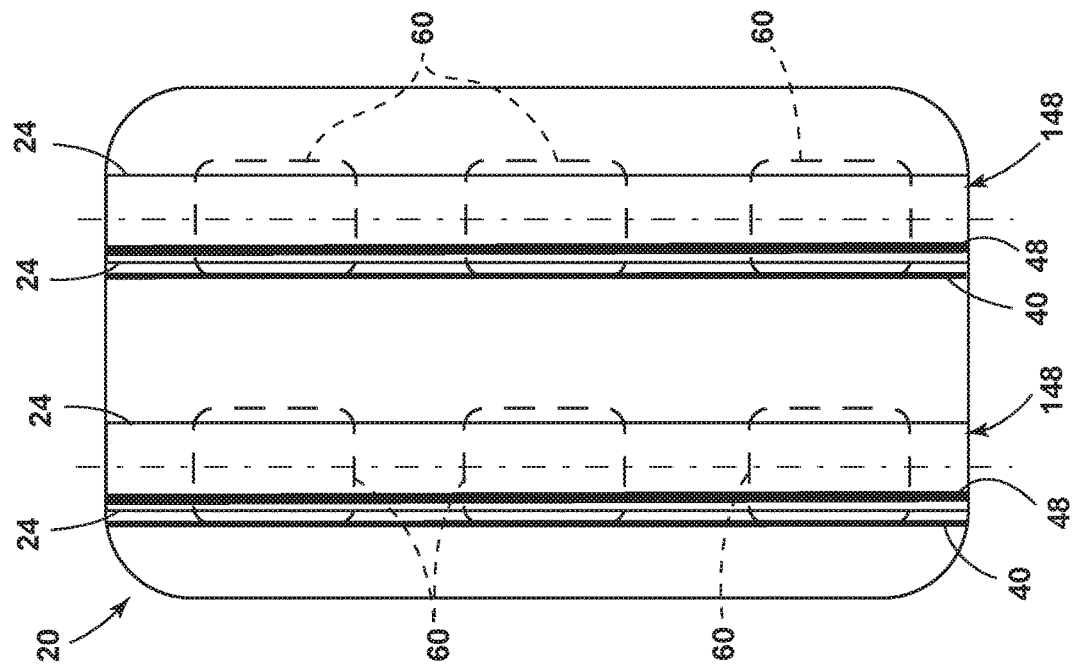
FIG. 8 is a top plan view of the vehicle, illustrating the seating assemblies engaged with tracks in a floor of the vehicle, according to one example.
Figure 7:
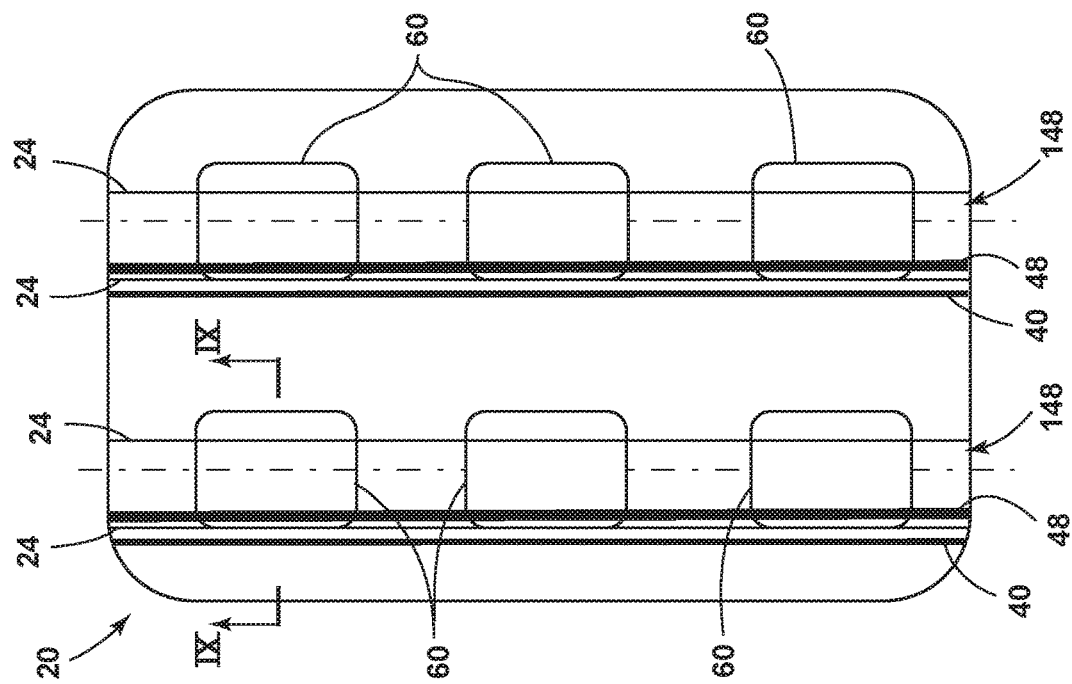
FIG. 7 is a top plan view of the vehicle, illustrating the seating assemblies engaged with tracks in a floor of the vehicle, according to one example.

Referring now to FIGS. 7 and 8, the tracks 24 may be made of a non-conductive material. A pair of tracks 24 that are positioned such that one of the seating assemblies 60 can engage with the pair of tracks 24 may be referred to as a track plank 148. One of the tracks 24 in each of the pair of tracks 24 or track planks 148 may be provided with the first transmitter 40 and the second transmitter 48. The first and second transmitters 40, 48 can be mounted on interior surfaces of the walls of the track 24 that define the guide channel 28 (see FIG. 9), on exterior surfaces of the walls of the track 24, and/or within the walls of the track 24. For examples where the first and second transmitters 40, 48 are mounted within the walls of the track 24, the first and second transmitters 40, 48 can be inserted into a slot or aperture that may be provided along the length of the walls of the track 24. By having at least the track 24 that is provided with the first and second transmitters 40, 48 made of a non-conductive material, the track 24 is prevented from interfering with transmissions that are being sent by the first and second transmitters 40, 48 (e.g., electrical power to the seating assemblies 60).

Figure 9:
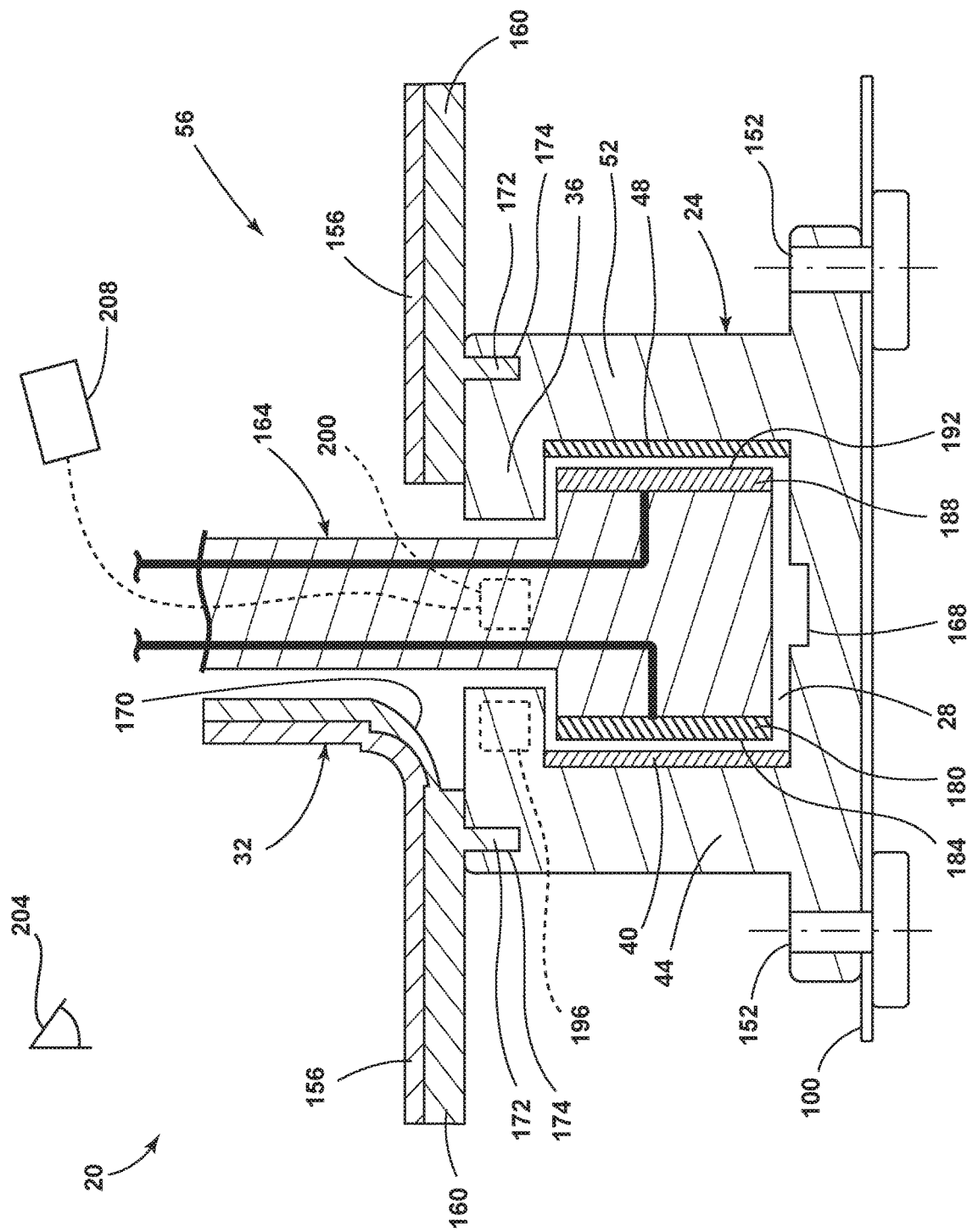
FIG. 9 is a cross-sectional view taken along line IX-IX of FIG. 7, illustrating an engagement between the track and an anchor, according to one example.

Referring to FIG. 9, the tracks 24 are mounted to the floor 100 of the vehicle 20. For example, the tracks 24 may be mounted to the floor 100 by one or more fasteners 152. A floor covering 156 extends over the tracks 24 and the floor 100 to present a user with a generally continuous and generally horizontal surface. The floor covering 156 may be a textile, fiber material, carpet, polymer, or any other suitable material. A support material 160 is positioned between the floor covering 156 and the tracks 24 and/or the floor 100. In various examples, a filler material may be provided between the floor 100 and an underside of the support material 160 at locations within the vehicle 20 where the tracks 24 are not installed. The filler material can be utilized to make up a difference in a vertical height between the floor 100 and the tracks 24 such that the user is presented with a generally horizontal and well-supported surface. An anchor 164 can engage with the guide channel 28. The anchor 164 may slidably engage with the track 24 such that the anchor 164 can be moved within the guide channel 28 to various locations within the vehicle 20. In various examples, the anchor 164 can be provided with a lock assembly that can extend into the track 24 at various locations such that the anchor 164 can be locked in position within the guide channel 28. For example, the lock assembly can extend vertically downward (e.g., as a locking pin) that engages with lock apertures 168 that are defined by the track 24 one or more of the anchors 164 can extend from the seating assembly 60, the storage units 112, and/or other structures/ features that a user desires to move about the cabin 56 along the tracks 24. As the anchor 164 traverses the extent of the track(s) 24, the anchor 164 can actuate the bridge 32 to an open position or raised position. The support material 160 of the bridge 32 can be provided with a variable thickness. For example, in regions of the cabin 56 where the tracks 24 are installed, the thickness of the support material 160 can be decreased in a region that defines a pivot point or living hinge 170 about which the bridge 32 can rotate or pivot to transition between open and closed positions. The region of the support material 160 that defines the living hinge 170 may be positioned between sections of the support material 160 that are provided with the full thickness of the support material 160. Said another way, the section or region of the support material 160 that defines the living hinge 170 may be provided with a lesser thickness than the regions or sections of the support material 160 that are juxtaposed to or flank the living hinge 170. The thickness of the support material 160 in the region or section of the support material 160 that spans the opening of the guide channel 28 in the upper portion 36 of the track 24 may be provided with the full thickness of the support material 160 to prevent caving in of the bridge 32 when the bridge 32 is exposed to vertical loads in the closed position (e.g., a user stepping on the closed bridge 32). The support material 160 can be provided with protrusions 172 that extend toward the tracks 24 and engage with corresponding slots 174 in the upper portion 36 of the track 24. The slots 174 are defined by the upper portion 36 of the track 24 and receive the protrusions 172. The engagement between the slots 174 and the protrusions 172 aid in retention and positioning of the floor covering 156 and the support material 160 within the cabin 56 of the vehicle 20. The engagement between the slots 174 and the protrusions 172 can be particularly useful in retaining the floor covering 156 and the support material 160 in an appropriate position when the anchors 164 actuate the bridge 32 to the open position. Actuating the bridge 32 to the open position may otherwise provide enough force to result in a misalignment of the floor covering 156 and the support material 160 relative to the track 24 and/or the guide channel 28 once the bridge 32 resumes the closed position. Additionally, actuating the bridge 32 to the open position without the engagement of the protrusions 172 with the slots 174 may result in a memory effect of the floor covering 156 and the support material 160 that can cause undulations in the surface of the floor covering 156 that is presented to a user when the bridge 32 is in the closed position. Accordingly, these undulations may present tripping hazards to occupants and/or cause sticking or binding of the seating assemblies 60 and/or the storage units 112 as they are actuated along the tracks 24 and presented with varying heights of the floor covering 156.

Referring again to FIG. 9, a first receiver 180 can be positioned on a first side 184 of the anchor 164 and a second receiver 188 can be positioned on a second side 192 of the anchor 164. In various examples, the first and second receivers 180, 188 may be electrical receivers. The first receiver 180 and/or the second receiver 188 on the anchor 164 receive a signal from at least one of the first and second transmitters 40, 48 on the guide channel 28. In various examples, the signal that is received by the first receiver 180 and/or the second receiver 188 from at least one of the first and second transmitters 40, 48 can be a power signal or another form of energy and/or data transfer. For example, the signal received by the first and/or second receivers 180, 188 from the first and/or second transmitters 40, 48 may be a power transfer signal. In one specific example, the power transfer signal can be transmitted from the first and/or second transmitters 40, 48 to the first and/or second receivers 180, 188 by capacitive power transfer. In various examples, the track 24 may be provided with a first transceiver 196 and the anchor 164 may be provided with a second transceiver 200. The first and/or second transceivers 196, 200 can be utilized to communicate data between the vehicle 20 (e.g., the track 24), the seating assembly 60, the storage units 112, the storage compartments 116, and/or the anchor 164. For example, the first and second transceivers 196, 200 can communicate data to and from the anchor 164. The data communicated to and from the anchor 164 can include, but is not limited to, location information regarding a location of the seating assembly 60 and/or the storage units 112 within the cabin 56 of the vehicle 20, configuration information regarding comfort settings of the seating assembly 60 (e.g., rotational position of the seatback 68 relative to the seat 64, swivel state of the seating assembly 60, temperature of the seating assembly 60, etc.), configuration information regarding relative positions of seating assemblies 60 and/or storage units 112, occupation status of the seating assemblies 60 and/or the storage compartments 116, temperature of the storage compartments 116 for storage compartments 116 that are climate controlled or climate adjustable, and so on. Examples of how the first transceiver 196 and/or the second transceiver 200 can be utilized to convey position information about where the anchor(s) 164 and their associated components (e.g., seating assemblies 60 and storage units 112) relative to the tracks 24 may be accomplished by utilizing a linear encoder, a linear potentiometer, resistance-based gates along the tracks 24, capacitor-based gates along the tracks 24, current-based gates along the tracks 24, and the like. In some examples, imagers 204 (e.g., cameras) may be utilized to monitor the cabin 56 of the vehicle 20 and convey information related to positioning of components and/or status of components (e.g., seating assemblies 60, storage units 112 within the cabin 56, open versus closed states of the storage compartments 116, occupancy status of seating assemblies 60, and so on). In the depicted example, a control module 208 may communicate with at least one of the first transceiver 196 and the second transceiver 200. The communication between the control module 208 and the first and/or second transceivers 196, 200 can be accomplished by a wired connection or by a wireless connection. When installed on the seating assemblies 60, the control module 208 may be referred to as a seat control module (SCM). When installed on the storage units 112 and/or the storage compartments 116, the control module 208 may be referred to as a cargo control module (CCM).

Referring further to FIG. 9, in various examples, the first and second transmitters 40, 48 can generate an electric field that transfers power into the first and second receivers 180, 188. The power transferred into the first and second receivers 180, 188 by the first and second transmitters 40, 48 can provide power to electrical components, electrical systems, and/or electrical assemblies that are present in the seating assemblies 60, the storage units 112, and/or the storage compartments 116 that are coupled to the anchors 164. For example, the seating assembly 60 can be provided with the seat control module (SCM) that accepts the transmitted power and directs the received power to a power storage unit (e.g., a battery) that is positioned on the seating assembly 60. The transmitted power may be conveyed by a carrier wave. Said another way, the power signal may be imposed on a carrier wave (e.g., by modulation) to aid in the facilitation of the power transmission from the first and second transmitters 40, 48 to the first and second receivers 180, 188. Accordingly, the SCM may demodulate or strip a modulated control signal, such as the power signal, from the imposed carrier wave. The SCM can capture position and state data from motors and transducers on the seating assembly 60 that monitor manual settings and impose those setting upon either the capacitive carrier field or a separate Controller Area Network (CAN) line. The power transfer rate of capacitive power transfer is lower than a direct contact system (e.g., typically less than 100 Watts). Therefore, in examples where capacitive power transfer is utilized, each seating assembly 60, storage unit 112, and/or storage compartment 116 can be outfitted with a batter from which power can be extracted (e.g., by the SCM).

Referring still further to FIG. 9, the SCM, and similar control module(s) on the storage units 112 and/or storage compartments 116, can allocate power from the battery between various components and functionalities of the seating assemblies 60. In some examples, the battery power may be allocated based on a pre-determined hierarchy of components and/or functionalities. For example, first priority of battery power may be given to safety functions of the seating assemblies 60, such as occupancy detection, seat belt latch detection, airbag sensors, airbag deployment, and the like. Next priority for battery power may be given to fore-aft and side-to-side position adjustment of the seating assembly 60 along the tracks 24 (e.g., longitudinal and/or lateral tracks). The fore-aft and side-to-side adjustment of the seating assemblies 60 along the tracks 24 may be referred to as macro-adjustments that are capable of reconfiguring the cabin 56 of the vehicle 20. The next priority for battery power may be given to positional comfort adjustments of the seating assemblies 60, which may include, but are not limited to, forward and rearward adjustment of the seating assemblies 60 to accommodate occupants of varying heights, vertical adjustments of the seating assemblies 60 relative to the floor 100, tilt or inclination of the seat 64, extent of reclined position of seatback 68 relative to the seat 64, rotational orientation or swivel displacement of the seating assembly 60 about a vertical axis, and the like. The positional comfort adjustments may be referred to as semi-macro-adjustments as these adjustments may be perceptible to other occupants of the vehicle 20. The next priority for battery power may be given to micro-adjustments of the seating assembly 60 that may not be easily perceptible by other occupants of the vehicle 20. The micro-adjustments may include lumbar support adjustments, heating of a surface of the seating assembly 60, cooling or ventilation of the surface of the seating assembly 60, massage functionality of the seating assembly 60, and the like. The hierarchy outlined above is not intended to be an exhaustive list. Rather, the hierarchy for battery power distribution is exemplary in nature and represents one example of how components and functionality of the seating assemblies 60 can be prioritized to provide battery power to essential components and/or functions of the seating assembly 60 before providing battery power to non-essential components and/or functionalities. For example, safety features and/or components may generally be given a higher rank or priority than comfort features and/or components.

Referring yet again to FIG. 9, an advantage of contactless power transfer, such as the capacitive power transfer discussed herein, is that there is no need to plug and unplug wiring harnesses from the seating assemblies 60 and/or the storage units 112 as the seating assemblies 60 and/or storage units 112 are coupled to and decoupled from the tracks 24. The contactless power transfer can also eliminate trailing wires and/or other tethers that may otherwise be coupled to the seating assemblies 60 and/or the storage units 112, thereby reducing the risk of entanglement within the tracks 24. By eliminating complex wire and/or tether management arrangements for the various wire bundles or harnesses that may be employed, a simple and robust structure for the floor 100 is provided that is not encumbered by wires and/or tethers that may limit freedom of movement and hinder reconfiguration of the seating assemblies 60 and/or the storage units 112 within the cabin 56. Positioning the first and second transmitters 40, 48 within or on the tracks 24 and positioning the first and second receivers 180, 188 within or on the anchors 164 that engage with the guide channel 28 can provide a number of advantages. For example, such an arrangement can protect the first transmitter 40, the second transmitter 48, the first receiver 180, and the second receiver 188 from mechanical damage that may otherwise occur during normal use if these components were positioned in a more exposed or accessible location. Additionally, such an arrangement of the first transmitter 40, the second transmitter 48, the first receiver 180, and the second receiver 188 can enable a short or small air gap between the first and second transmitters 40, 48 and the first and second receivers 180, 188 such that signal transfers between these components can he done in a more efficient manner than if a larger or greater air gap separated the components. Further, such an arrangement of the first transmitter 40, the second transmitter 48, the first receiver 180, and the second receiver 188 enables the transfer of power from a stationary component (i.e., the tracks 24) to a moving component (e.g., the anchor 164) without restricting the design of the seating assembly 60 or the storage unit 112. Still further, while it may be beneficial for the tracks 24 to be made of a non-conductive material, the arrangement of the first transmitter 40, the second transmitter 48, the first receiver 180, and the second receiver 188 can be employed in examples where the tracks 24 are made of a conductive material by providing a shielding layer between the first transmitter 40, the second transmitter 48, and the track 24. A shielding layer may also be provided between the first receiver 180, the second receiver 188, and the anchor 164. The shielding layer(s) may be thin, lightweight, and inexpensive. Accordingly, modifying or retrofitting existing, conductive tracks 24 can be done in an efficient and cost effective manner.

Figure 10:
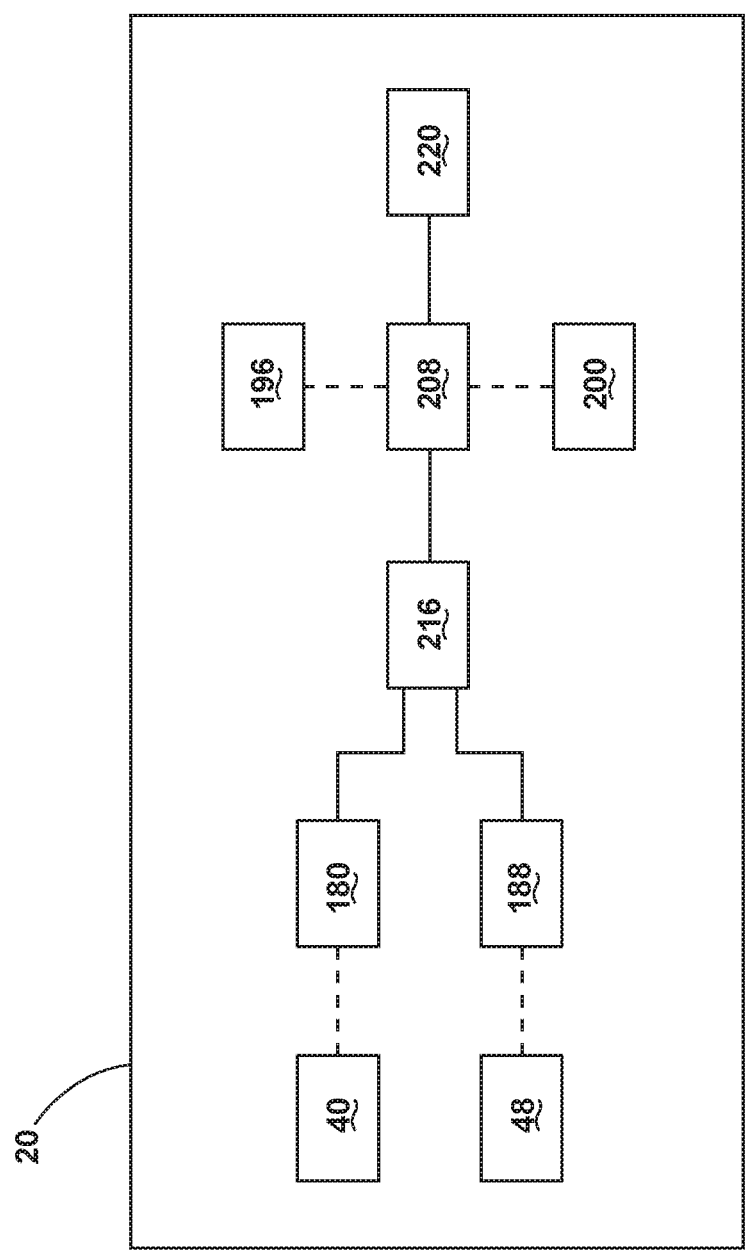
FIG. 10 is a schematic of the vehicle, according to one example.

Referring now to FIG. 10, an exemplary block diagram of the vehicle 20 is shown that illustrates one example of how the vehicle 20 and the structures carried by the anchors 164 (e.g., the seating assemblies 60, the storage units 112, and/or the storage compartments 116) interact. In the depicted example, the first and second transmitters 40, 48 can wirelessly transfer a signal, such as a power signal, to the first and second receivers 180, 188. The transmitted signal may then be stored in a storage location 216, such as a battery for examples where the signal is a power signal. Distribution of the stored signal from the storage location 216 can be accomplished by the control module 208. In examples where the stored signal is power stored in a battery, the control module 208 can direct power to various component groups 220 based on a predetermined hierarchy. In various examples, the predetermined hierarchy may be employed in deciding where power is sent on a continual basis. Alternatively, the predetermined hierarchy may be employed once the battery has reached a predetermined level of depletion. In some examples, the first and/or second transceivers 196, 200 may communicate with the control module 208 and provide data about the vehicle 20, the seating assemblies 60, the storage units 112, and/or the storage compartments 116. The communication between the first transceiver 196, the second transceiver 200, and/or the control module 208 may be wireless communication.

Demand for seating comfort and convenience drives the use of extensive wiring harnesses for electrical supply and communication in vehicle seating assemblies. Wire bundles and wiring harnesses become problematic when used with track-mounted and/or swivel seating assemblies. In particular, the length from the seating assemblies to the source of electrical power (e.g., vehicle battery) is constantly changing and each seating assembly utilizes an individual wire bundle, resulting in a heavy and tangle-prone network of wiring. Accordingly, the present disclosure provides an approach that circumvents these disadvantages and challenges in meeting the demand of consumers while decreasing the number of wiring harnesses and wire bundles that extend between the seating assemblies 60 and/or the storage units 112, thereby preventing tangling of wires.

Modifications of the disclosure will occur to those skilled in the art and to those who make or use the concepts disclosed herein. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It will be understood by one having ordinary skill in the art that construction of the described concepts, and other components, is not limited to any specific material. Other exemplary embodiments of the concepts disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, and the nature or numeral of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further, it is to be understood that such concepts are intended to be covered by the following claims, unless these claims, by their language, expressly state otherwise.

What is claimed is:

1. A vehicle, comprising:
   a track defining a guide channel, wherein the track comprises a first transceiver;
   first and second transmitters positioned on first and second sides of the guide channel, respectively; and
   an anchor that engages with the guide channel, wherein the anchor comprises first and second receivers positioned on first and second sides of the anchor, respectively, and wherein the anchor comprises a second transceiver, wherein the first transceiver communicates data to the second transceiver and the first transceiver receives data from the second transceiver, wherein the second transceiver is coupled to a control module such that a path of communication is established between the first transceiver and the control module, and wherein the control module is selected from the group consisting of a seat control module and a cargo control module.

2. The vehicle of claim 1, further comprising:
   a bridge that extends over an upper portion of the track to cover the guide channel when in a closed position.

3. The vehicle of claim 2, wherein the anchor actuates the bridge to an open position.

4. The vehicle of claim 3, wherein the bridge pivots as the bridge is transitioned between the open position and the closed position.

5. The vehicle of claim 1, wherein the first and second receivers on the anchor receive a signal from at least one of the first and second transmitters on the guide channel.

6. The vehicle of claim 5, wherein the signal received by the first and second receivers from the first and second transmitters is a power transfer signal.

7. The vehicle of claim 6, wherein the power transfer signal is transmitted from the first and second transmitter to the first and second receivers by capacitive power transfer.

8. The vehicle of claim 1, wherein the first and second transceivers communicate data to one another in a wireless fashion.

9. A vehicle, comprising:
   a track defining a guide channel, wherein the track comprises a first transceiver such that the first transceiver is housed within the track;
   first and second electrical transmitters positioned on first and second sides of the guide channel, respectively; and
   first and second electrical receivers positioned on first and second sides of an anchor, respectively, the anchor being received within the guide channel and configured to communicate with the first and second electrical transmitters, wherein the anchor comprises a second transceiver, and wherein the second transceiver is positioned within the anchor such that the second transceiver is positioned within the guide channel when the anchor is coupled to the track, wherein the first transceiver communicates data to the second transceiver and the first transceiver receives data from the second transceiver, wherein the second transceiver is coupled to a control module such that a path of communication is established between the first transceiver and the control module, and wherein the control module is selected from the group consisting of a seat control module and a cargo control module.

10. The vehicle of claim 9, further comprising:
    a bridge that extends over an upper portion of the track to cover the guide channel when in a closed position.

11. The vehicle of claim 10, wherein the anchor actuates the bridge to an open position at locations along the track where the anchor is located.

12. The vehicle of claim 9, wherein the first and second electrical receivers on the anchor receive a signal from at least one of the first and second electrical transmitters on the guide channel.

13. The vehicle of claim 12, wherein the signal received by the first and second electrical receivers from the first and second electrical transmitters is a power transfer signal.

14. The vehicle of claim 13, wherein the power transfer signal is transmitted from the first and second electrical transmitters to the first and second electrical receivers by capacitive power transfer.

15. The vehicle of claim 9, wherein the first and second transceivers communicate data to one another in a wireless fashion.

16. A vehicle, comprising:
    a track defining a guide channel, wherein the track comprises a first transceiver;
    first and second transmitters positioned on first and second sides of the guide channel, respectively;
    a bridge that extends over an upper portion of the track when in a closed position;
    an anchor that engages with the guide channel and pivots the bridge to an open position, wherein the anchor comprises a second transceiver, wherein the first transceiver communicates data to the second transceiver and the first transceiver receives data from the second transceiver, wherein the second transceiver is coupled to a control module such that a path of communication is established between the first transceiver and the control module, and wherein the control module is selected from the group consisting of a seat control module and a cargo control module; and
    first and second receivers positioned on first and second sides of the anchor, respectively.

17. The vehicle of claim 16, wherein the first and second receivers on the anchor receive a signal from at least one of the first and second transmitters on the guide channel.

18. The vehicle of claim 17, wherein the signal received by the first and second receivers from the first and second transmitters is a power transfer signal.

19. The vehicle of claim 18, wherein the power transfer signal is transmitted from the first and second transmitter to the first and second receivers by capacitive power transfer.

20. The vehicle of claim 16, wherein the first and second transceivers communicate data to one another in a wireless fashion.

* * * * *